(12) United States Patent
Kaplan et al.

(10) Patent No.: US 8,166,384 B1
(45) Date of Patent: Apr. 24, 2012

(54) ENVIRONMENT-BASED BOOKMARK MEDIA

(75) Inventors: Michael Kaplan, Santa Cruz, CA (US);
Kirk B. Gould, Cupertino, CA (US);
Brandyn Webb, Oceanside, CA (US)

(73) Assignee: Adobe Systems Incorporated, San Jose, CA (US)

( * ) Notice: Subject to any disclaimer, the term of this patent is extended or adjusted under 35 U.S.C. 154(b) by 2957 days.

(21) Appl. No.: 09/594,054

(22) Filed: Jun. 14, 2000

(51) Int. Cl.
*G06F 17/00* (2006.01)

(52) U.S. Cl. ......... 715/206; 715/810; 707/736; 709/201

(58) Field of Classification Search .................. 715/500, 715/501, 501.1, 513, 526, 854, 206; 707/1–5, 707/102; 709/231–245, 203, 206, 217, 219, 709/733; 345/739, 808, 855, 581; 386/241
See application file for complete search history.

(56) References Cited

U.S. PATENT DOCUMENTS

| | | | | |
|---|---|---|---|---|
| 6,032,162 A * | 2/2000 | Burke | ........................ | 715/501.1 |
| 6,041,360 A * | 3/2000 | Himmel et al. | ................ | 709/245 |
| 6,085,226 A * | 7/2000 | Horvitz | ......................... | 709/203 |
| 6,175,842 B1 * | 1/2001 | Kirk et al. | ...................... | 715/513 |
| 6,269,403 B1 * | 7/2001 | Anders | .......................... | 709/231 |
| 6,297,819 B1 * | 10/2001 | Furst | .............................. | 345/733 |
| 6,313,855 B1 * | 11/2001 | Shuping et al. | ................ | 715/854 |
| 6,314,423 B1 * | 11/2001 | Himmel et al. | ................. | 707/10 |
| 6,389,541 B1 * | 5/2002 | Patterson | ....................... | 713/201 |
| 6,496,829 B1 * | 12/2002 | Nakamura | ....................... | 707/10 |
| 6,560,640 B2 * | 5/2003 | Smethers | ....................... | 709/219 |

* cited by examiner

*Primary Examiner* — Amelia Rutledge
*Assistant Examiner* — Quoc A Tran
(74) *Attorney, Agent, or Firm* — Fish & Richardson P.C.

(57) ABSTRACT

A server within an online environment is configured to store a set of bookmark media objects that provide a multimedia preview of the destinations within the environment. The bookmark media objects can be graphic thumbnails of corresponding web pages, audio streams, video streams or any combination thereof or other suitable media that provides a representation of the destination. A client device is communicatively coupled to the server and is configured to store references to the network destinations and references to the corresponding bookmark media objects. A web browser executing in an operating environment provided by the client device is configured to retrieve and present the bookmark media objects to a user for selection. Based on the selection, the web browser accesses the corresponding network destination. Each bookmark media object is updated as a function of a current state of the corresponding network destination, user information or general conditions of the computing environment.

46 Claims, 7 Drawing Sheets

ENVIRONMENT-BASED BOOKMARK MEDIA

BACKGROUND

The present invention relates to using environment-based bookmark media.

The Internet is a collection of integrated networks spanning the world and includes hundreds of thousands of online environments, such as a web sites and chat rooms. These environments are collectively referred to as the World Wide Web (WWW) and provide electronic "content", including text, graphics, audio and video. The content is often defined by a document, referred to as a web page, that conforms to the HyperText Markup Language (HTML). HTML is a formatting language that defines a number of tags for formatting the content of the web page and allows embedding references to other destinations within the WWW. Each destination on the WWW is uniquely identified by a global address referred to as a Uniform Resource Locator (URL). The URL identifies the particular server storing the media as well as the media's location within the server.

There are several software applications, called web browsers, by which a user can easily navigate the World Wide Web, access the online environments and view the electronic content. Modern web browsers can display graphics as well as text and can present multimedia information including sound and video. Using a web browser, a user can jump from one destination to another by selecting one of the embedded references, also referred to as links. When the user views media from one destination and selects one of the embedded references, the web browser downloads media from the destination identified by the link and presents the media to the user. In this manner, the user navigates the World Wide Web, jumping from one destination to another Conventional web browsers support a "bookmarking" feature that lets the user save the URLs of frequently accessed destinations within the World Wide Web. The user can easily access the destinations at a later time by simply viewing his or her bookmarked URLs and selecting the desired destination. Modern bookmark management software applications allow the user to organize and manage the collection of bookmarks.

SUMMARY OF THE INVENTION

In general, the invention provides a method and apparatus, including a computer program apparatus, implementing techniques to provide an up-to-date multimedia preview of a user's favorite destinations within a network environment.

According to one aspect, the techniques are directed to a method in which a client device stores a set of references to external destinations in a network environment and a second set of references that identifies a remote bookmark media object for each destination. The bookmark media objects are retrieved and presented to a user for selection. The network destination corresponding to the selected bookmark media object is accessed as a function of its respective stored reference. The bookmark media object can be a thumbnail, a video stream, an audio stream or any combination thereof or other suitable media.

In another aspect, the invention is directed to a system in which a server within an online environment is configured to store a set of bookmark media objects. The bookmark media objects can be thumbnails of corresponding web pages, audio streams, video streams or any combination thereof that provides a representation of a destination. A client device is communicatively coupled to the server and is configured to store references to the network destinations and references to the corresponding bookmark media objects. A web browser executing in an operating environment provided by the client device is configured to present the bookmark media objects to a user for selection. Based on the selection, the web browser accesses the corresponding network destination. Each remote bookmark media object is updated as a function of a current state of the corresponding network destination, user information or general conditions of the computing environment.

According to yet another aspect, the invention is a computer-readable medium having instructions stored thereon to cause a programmable processor to store on a client device a set of references to external destinations in a network environment, each destination having an associated bookmark media object. The instructions further cause the programmable processor to retrieve and present the bookmark media objects to a user for selection and access the network destination corresponding to the selected media object.

The invention offers several advantages. For example, the bookmark media objects provide a visual or audio hint as to the state of a destination without requiring the user to access the destination. This is especially advantageous when the user is navigating a three-dimensional network environment. Furthermore, unlike conventional client-based bookmarks, the environment-based bookmark media objects are advantages in that the associated destinations within the network environment can change locations without rendering the user's bookmarks useless.

Various embodiments of the invention are set forth in the accompanying drawings and the description below. Other features and advantages of the invention will become apparent from the description, the drawings, and the claims.

DETAILED DESCRIPTION

Figure 1:
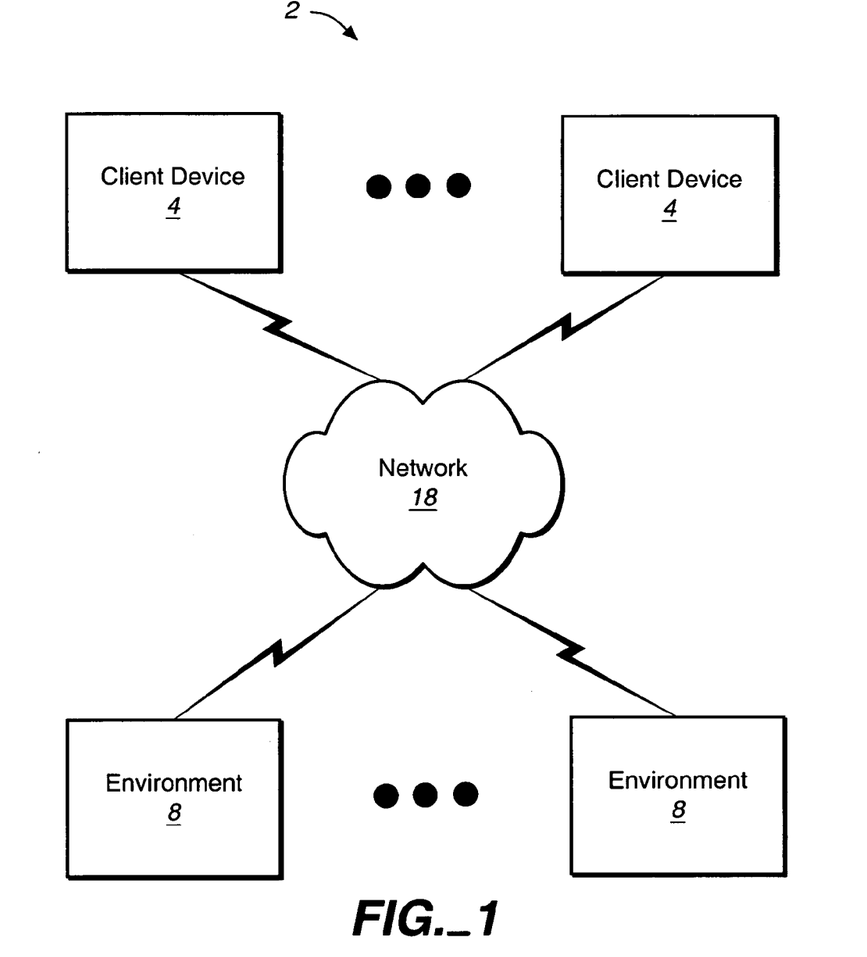
FIG. 1 is a block diagram illustrating a networked system in which client devices and online environments cooperate to present user dynamic, multimedia previews of corresponding network destinations.

FIG. 1 is a block diagram illustrating a system 2 in which environment-based bookmark media objects are used to provide multimedia previews of network destinations. Generally, system 2 includes a number of client devices 4 that are coupled to online environments 8 via network 18. Each environment 8 represents an online environment that is remotely accessible via a web browser, such as a web site, a chat room and, as illustrated below, a three-dimensional virtual world. Each environment 8 includes one or more destinations. Examples of destinations within online environments 8 include individual web pages within a web site, particular online chat rooms and entry points to three-dimensional worlds. Each environment 8 generates and maintains a corresponding bookmark media object for each destination. As explained in detail below, client devices 4 use these environment-based media objects to support improved bookmarking features. More specifically, when the users wish to access favorite destinations, client devices 4 present the media objects to the users for selection, thereby providing a preview of each destination.

The environment-based bookmark media objects provide dynamic representations of the destinations. For example, a bookmark media object can be a "thumbnail," which is a miniature display of the corresponding destination. The thumbnails allow the user to see the general layout of the destination without accessing the destination. The bookmark media objects may also include audio and video media. For example, a bookmark object may be an audio stream, a video stream, or a combination thereof. The bookmark media objects provide a multimedia preview of the corresponding destinations such that the user to can better choose a target destination than with conventional bookmarks.

Figure 2:
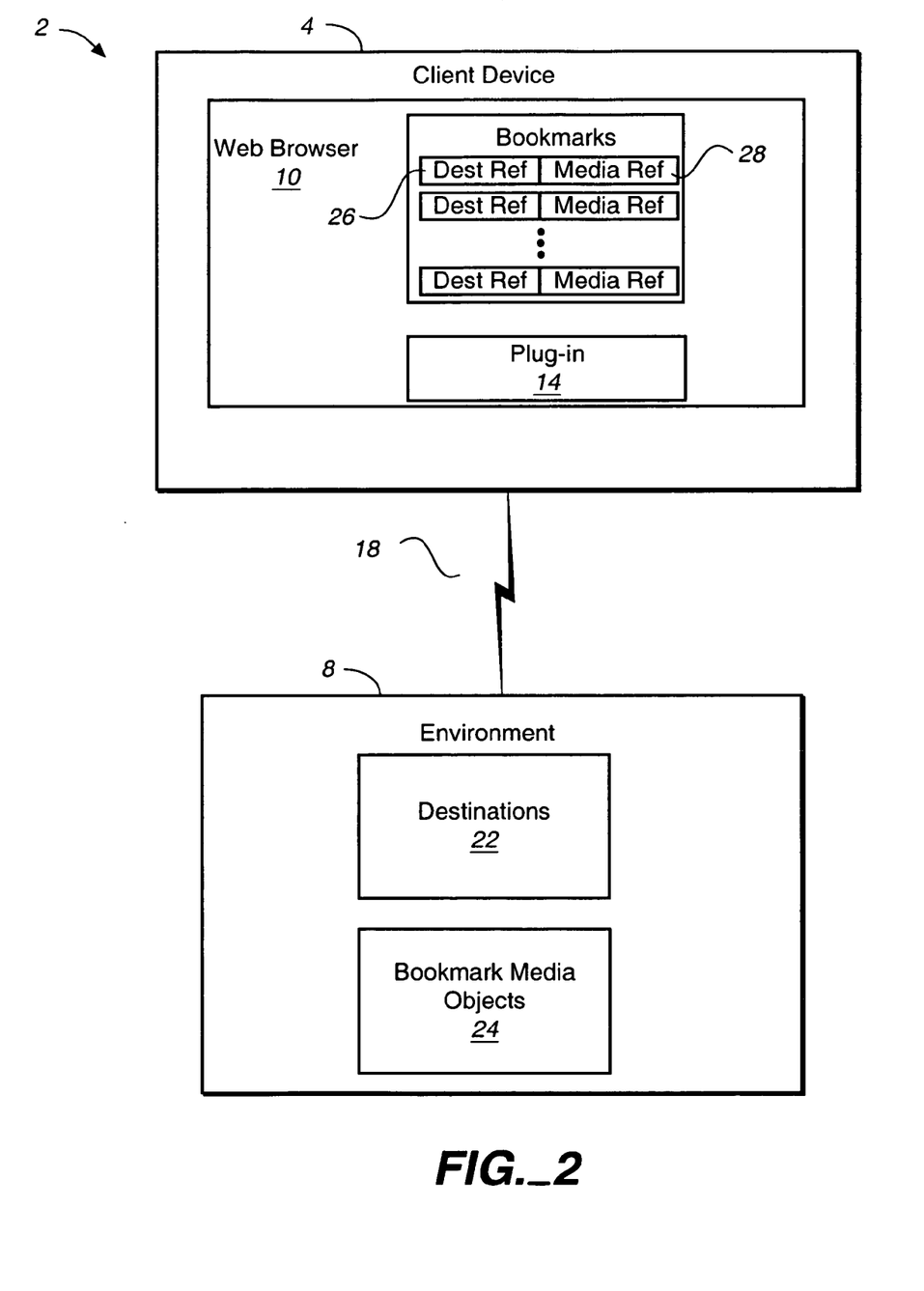
FIG. 2 is a block diagram further illustrating the components of the invention.

FIG. 2 is a block diagram further illustrating the details of the invention. Web browser 10, such as Internet Explorer™ from Microsoft™ Corporation of Redmond, Wash., executes in an operating environment provided by client device 4 and allows a user to remotely access the destination provided by environments 8. Client devices 4 represent general purpose computing systems suitable for interacting with environments 8 via network 18. One example of a suitable client device 4 is a personal computer. In addition, each client device 4 can be a laptop computer, a handheld computer, a personal digital assistant (PDA), such as a Palm™ organizer from Palm Inc. of Santa Clara, Calif., or a network-enabled cellular telephone. Network 18 represents any communication network, such as a packet-based digital network like the Internet.

Environment 8 provides one or more destination 22 and corresponding bookmark media objects 24. Environment 8 represents any online environment remotely accessible via web browser 10, such as web sites, chat rooms and, as illustrated below, three-dimensional virtual worlds. As such, environment 8 typically includes one or more servers (not shown), such as a web server executing web server software. In addition, environment 8 may include one or more database servers, such as SQL Server from Microsoft Corporation or the Oracle™ database engine from Oracle Corporation.

To facilitate the unique bookmarking features, web browser 10 maintains two sets of references, such as URL addresses, that uniquely identify favorite destinations and their corresponding media objects. More specifically, web browser 10 maintains destination references 26 and media object references 28. Destination references 26 identify the bookmarked destinations 22 within environment 8. Each destination reference 26 is paired with a media object reference 28 that uniquely identifies the corresponding bookmark media objects 24. The pair of references allow web browser 10 to present the bookmark media objects 24 to the user and access one of the destination 22 as a function of the user's selection. Alternatively, the location of each bookmark media object 24 can be a function of the location of the corresponding destinations 22. For example, a web page located at http://www.adobe.com/page1.html can have a corresponding bookmark media object 24 located at http://www.adobe.com/page1.obj. In this manner, web browser 10 need not store two separate references.

Plug-in 14 is a software module that provides additional features to web browser 10, thereby allowing web browser 10 to support the improved bookmarking capabilities. For example, plug-in 14 allows web browser 10 to present the bookmark media objects 24 when the user views his or her bookmarked destinations. Web browser 10 traverses the media object references 28 and checks the status of each bookmark media object 24 stored on environment 8. Web browser 10 retrieves a new copy of any bookmark object 24 that is accessible and that has been updated by environment 8. When the user wishes to view his or her favorite destinations, i.e., the bookmarked destination, web browser 10 presents bookmark media objects 22 identified by media object references 28. Depending on the actual bookmark media objects 24 identified, web browser 10 may present a variety of multimedia outputs including graphic thumbnails, audio or video content, or any combination thereof.

Figure 3:
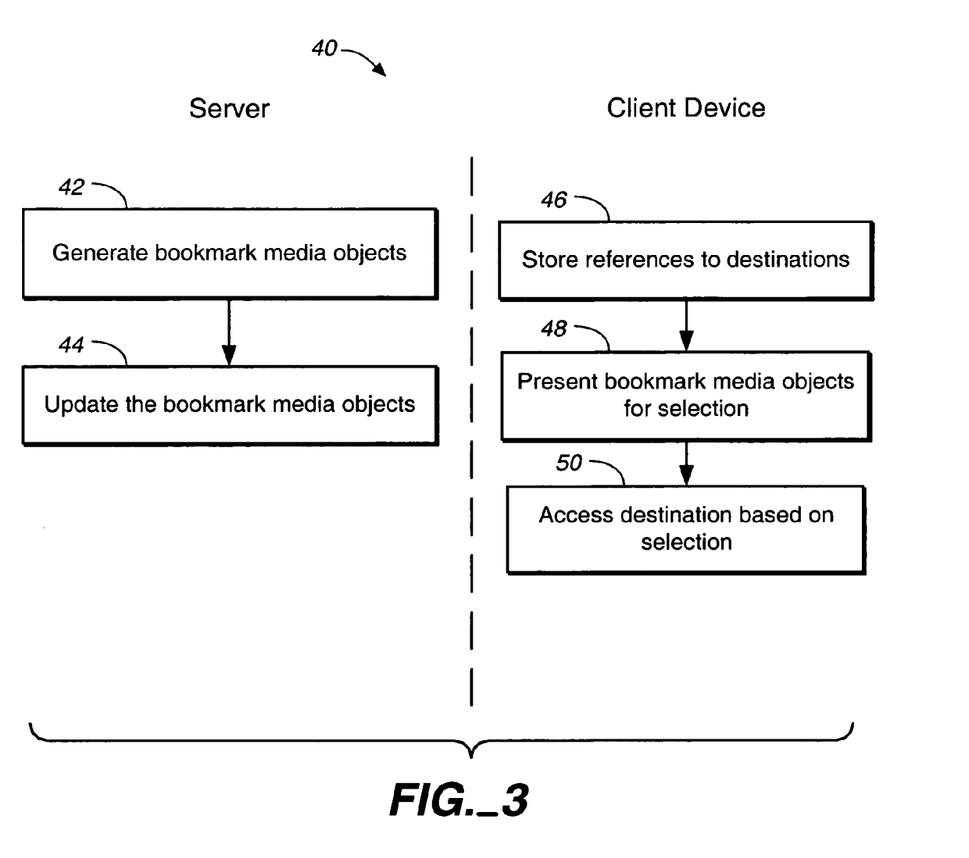
FIG. 3 is a flowchart illustrating an example process of providing multimedia previews of network destinations.

FIG. 3 is a flow chart illustrating one implementation of a process 40 by which client device 4 and environment 8 cooperate to present the user with dynamic, multimedia previews of his or her favorite destinations. Environment 42 generates bookmark media objects 24 for each destination 22 (step 42). This task may be automated such that, for example, a thumbnail is generated for each web page. Alternatively, a publisher that is responsible for creating the content of environment 8 may manually create each bookmark media object 24 using conventional publishing tools.

Next, environment 8, or the publisher, updates bookmark media objects 24 such that each bookmark media object 24 reflects a current state of its corresponding destination 22 (step 44). For example, environment 8 can automatically update the media objects 24 as a function of "environment-determined" conditions, such as current loading conditions at environment 8 and changes in content provided by environment 8. In addition, environment 8 can update the bookmark media objects 24 based on information received from client devices 4, such as user identification or other cached information. Also, environments 8 can update the media objects based on general computing conditions, such as a current bandwidth of network 18. In this fashion, each bookmark media object dynamically reflects the respective network destination and its accessibility.

When the user designates a particular destination 22 for bookmarking, web browser 10 executing on client device 4 stores a destination reference 26 as well as a corresponding media object reference 28 (step 46). At a later time when the user wishes to revisit a favorite destination, web browser 48 retrieves and presents the bookmark media objects 22 that are identified by media object references 28 (48). Web browser 10 can retrieve the bookmark media objects 24 upon first execution or when directed by the user. In addition, web browser 10 need only retrieve those bookmark media objects 24 that have changed relative to any locally cached objects. In one configuration, web browser 10 presents the bookmark media objects in matrix form for selection by the user. After the user has selected a bookmark media object 24, web browser 10 accesses the corresponding destination 22 as a function of the corresponding destination reference 26 (step 50).

Figure 4:
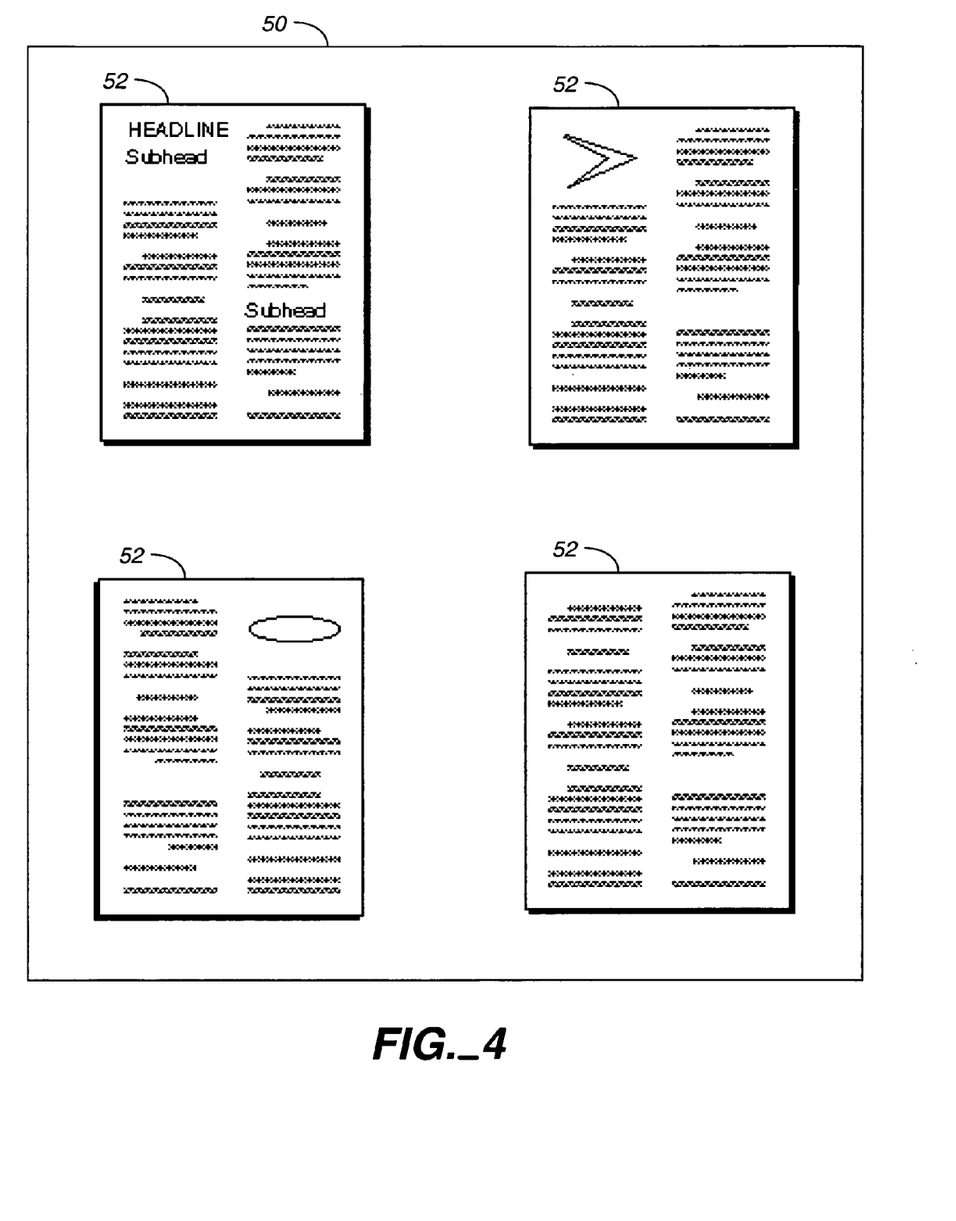
FIG. 4 illustrates a window presented by a web browser that displays a matrix of graphic thumbnails corresponding to favorite network destinations.

FIG. 4 illustrates an example bookmark window 50 presented by web browser 10. Window 10 displays a matrix of thumbnails 52. In the illustrated example, each thumbnail is an up-to-date miniature display of a web page at the corresponding destination that reflects the current state of the web page. When the user selects one of the thumbnails 52, web browser 10 accesses the corresponding destination and retrieves the complete web page.

Figure 5:
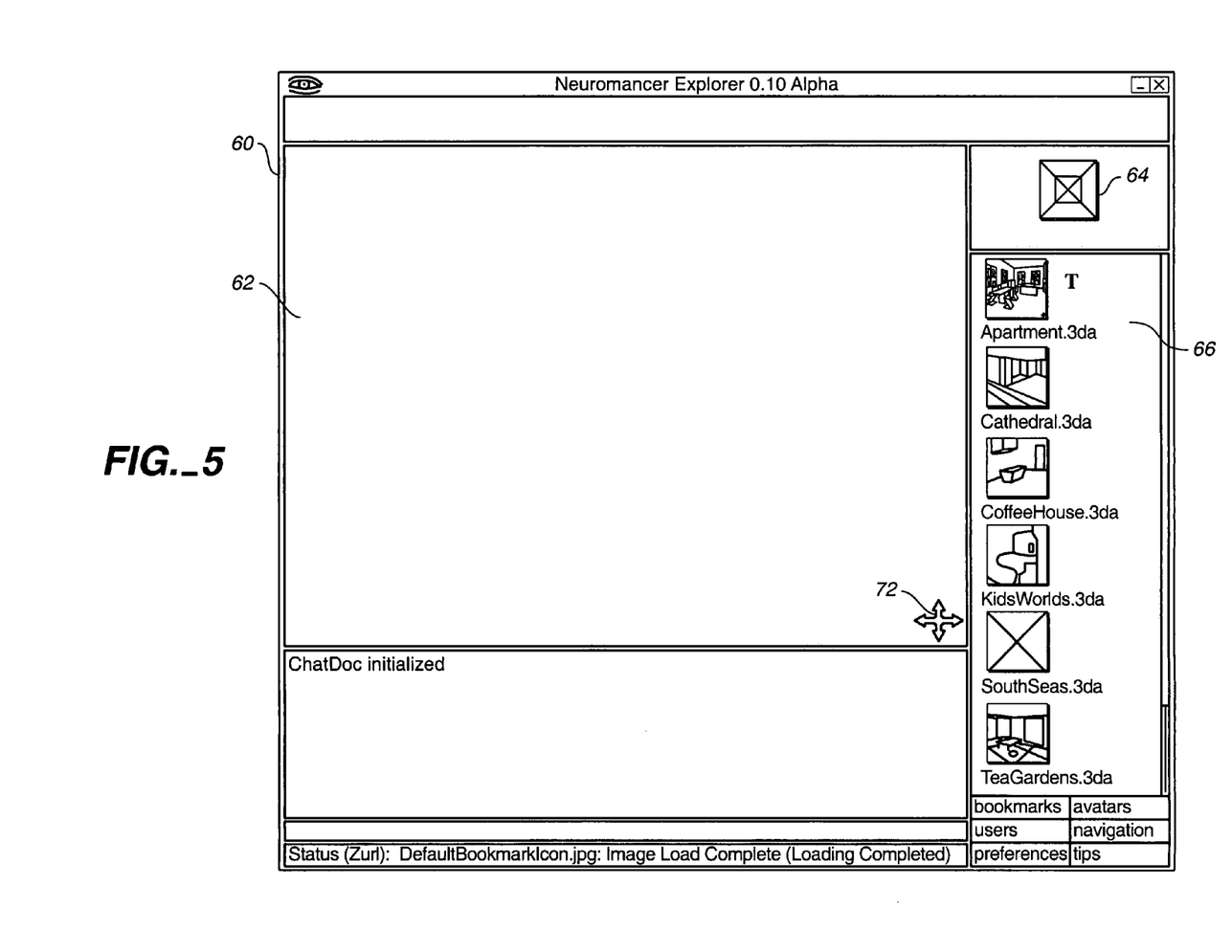
FIGS. 5 and 6 illustrate additional examples of windows presented by a web browser according to the invention.

FIG. 5 illustrates another example of a window 60 presented by web browser 10. Window 60 includes a view screen 62 for displaying content from environment 8. Current bookmark object 64 displays the bookmark media object for the current destination being accessed. As illustrated in FIG. 5, the user has not yet accessed a particular destination 22. Therefore, view screen 62 is blank and current bookmark media object 64 displays a default graphic image. Bookmark window 66 displays a number of bookmark media objects 66 that the user can select. Each bookmark media object 66 is retrieved from an environment 8 and displayed to the user in order to present an up-to-date multimedia preview of the corresponding destination. Bookmark window 66 displays the default graphic image for any destinations that are currently inaccessible.

Figure 6:
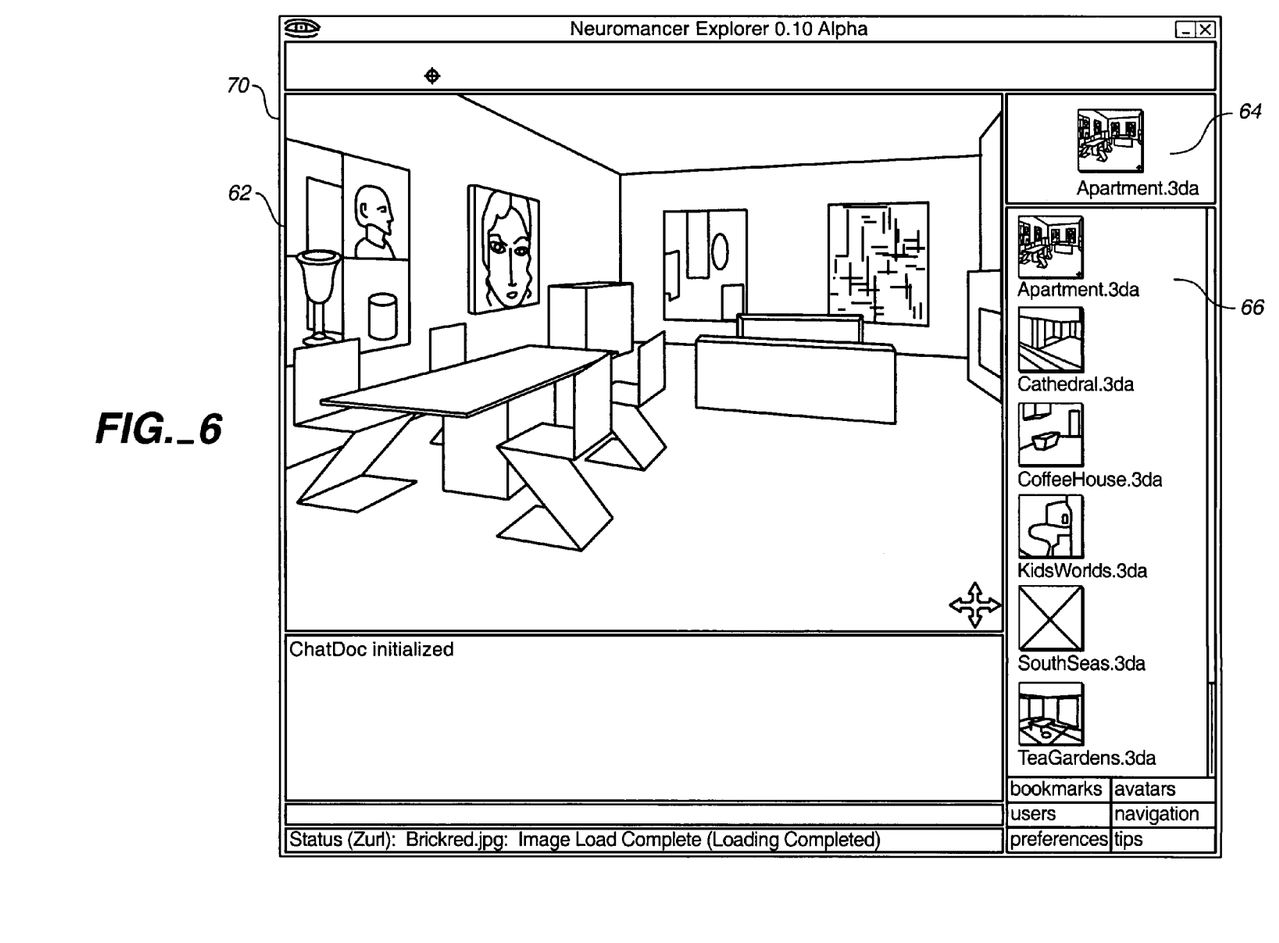

FIG. 6 illustrates a window 70 presented by web browser 10 after the user has selected a particular destination 22. View screen 62 displays content received from the destination 22, which in this example is a three-dimensional world. Current bookmark object 64 displays a graphic thumbnail of the current destination. Using navigation bar 72, the user can move in various directions and traverse the 3D world. In order to bookmark the current destination, the user can drag current bookmark object 64 into bookmark window 66 using a conventional pointing mechanism, such as a mouse.

Figure 7:
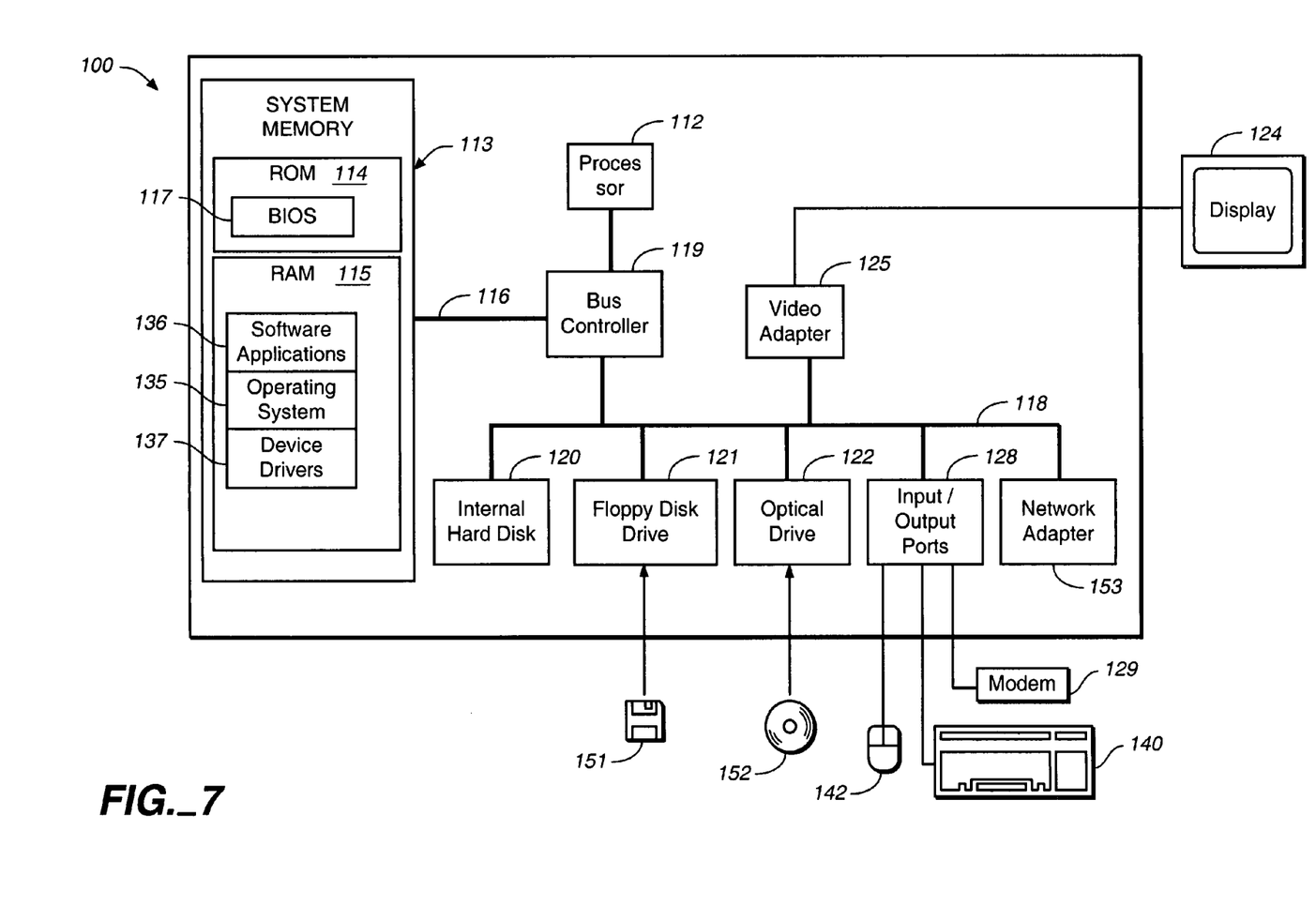
FIG. 7 is a block diagram illustrates one embodiment of a computer suitable for implementing the various embodiments of the invention.

FIG. 7 illustrates a programmable computing system (system) 100 that provides an operating environment suitable for use as a client device 4 or as a server within environment 8. System 100 includes a processor 112 that in one embodiment belongs to the PENTIUM®=family of microprocessors manufactured by the Intel Corporation of Santa Clara, Calif. However, the invention can be implemented on computers based upon other microprocessors, such as the MIPS® family of microprocessors from the Silicon Graphics Corporation, the POWERPC® family of microprocessors from both the Motorola Corporation and the IBM Corporation, the PRECISION ARCHITECTURE® family of microprocessors from the Hewlett-Packard Company, the SPARC® family of microprocessors from the Sun Microsystems Corporation, or the ALPHA® family of microprocessors from the Compaq Computer Corporation. In various configurations, system 100 represents any server, personal computer, laptop or even a battery-powered, pocket-sized, mobile computer known as a hand-held PC or personal digital assistant (PDA).

System 100 includes system memory 113, including read only memory (ROM) 114 and random access memory (RAM) 115, which is connected to the processor 112 by a system data/address bus 116. ROM 114 represents any device that is primarily read-only including electrically erasable programmable read-only memory (EEPROM), flash memory, etc. RAM 115 represents any random access memory such as Synchronous Dynamic Random Access Memory.

Within the system 100, input/output bus 118 is connected to the data/address bus 116 via bus controller 119. In one embodiment, input/output bus 118 is implemented as a standard Peripheral Component Interconnect (PCI) bus. The bus controller 119 examines all signals from the processor 112 to route the signals to the appropriate bus. Signals between the processor 112 and the system memory 113 are merely passed through the bus controller 119. However, signals from the processor 112 intended for devices other than system memory 113 are routed onto the input/output bus 118.

Various devices are connected to the input/output bus 118 including hard disk drive 120, floppy drive 121 that is used to read floppy disk 151, and optical drive 122, such as a CD-ROM drive that is used to read an optical disk 152. The video display 124 or other kind of display device is connected to the input/output bus 118 via a video adapter 125.

Users enter commands and information into the system 100 by using a keyboard 140 and/or pointing device, such as a mouse 142, which are connected to bus 118 via input/output ports 128. Other types of pointing devices (not shown) include track pads, track balls, joysticks, data gloves, head trackers, and other devices suitable for positioning a cursor on the video display 124.

System 100 also includes a modem 129. Although illustrated as external to the system 100, those of ordinary skill in the art will quickly recognize that the modem 129 may also be internal to the system 100. The modem 129 is typically used to communicate over wide area networks (not shown), such as the global Internet. Modem 129 may be connected to a network using either a wired or wireless connection.

Software applications 136 and data are typically stored via one of the memory storage devices, which may include the hard disk 120, floppy disk 151, CD-ROM 152 and are copied to RAM 115 for execution. In one embodiment, however, software applications 136 are stored in ROM 114 and are copied to RAM 115 for execution or are executed directly from ROM 114.

In general, the operating system 135 executes software applications 136 and carries out instructions issued by the user. For example, when the user wants to load a software application 136, the operating system 135 interprets the instruction and causes the processor 112 to load software application 136 into RAM 115 from either the hard disk 120 or the optical disk 152. Once one of the software applications 136 is loaded into the RAM 115, it can be used by the processor 112. In case of large software applications 136, processor 112 loads various portions of program modules into RAM 115 as needed.

The Basic Input/Output System (BIOS) 117 for the system 100 is a set of basic executable routines that have conventionally helped to transfer information between the computing resources within the system 100. Operating system 135 or other software applications 136 use these low-level service routines. In one embodiment system 100 includes a registry (not shown) that is a system database that holds configuration information for system 100. For example, the Windows® operating system by Microsoft Corporation of Redmond, Wash., maintains the registry in two hidden files, called USER.DAT and SYSTEM.DAT, located on a permanent storage device such as an internal disk.

Various embodiments have been described for using environment-based bookmark media objects to provide up-to-date multimedia previews of favorite destinations. The invention has been described in terms of particular embodiments. Other embodiments are within the scope of the following claims.

What is claimed is:

1. A method comprising:
   receiving a first user input on a client device bookmarking a remote destination displayed on the client device;
   in response to the first user input, storing a link to the destination and a link to a remote bookmark media object associated with the destination on the client device;
   receiving a second user input on the client device requesting a display of a bookmark window;
   in response to the second user input, displaying a bookmark window, retrieving the remote associated bookmark media object, including in the displayed bookmark window a bookmark for the destination and the retrieved remote associated bookmark media object, the retrieved remote associated bookmark media object providing a representation of the destination;
   receiving a third user input on the client device selecting the remote associated bookmark media object displayed in the bookmark window; and in response to the third user input, accessing the destination.

2. The method of claim 1 further comprising storing on the client device a set of references to a plurality of bookmark media objects in response to a user input bookmarking each corresponding remote destination.

3. The method of claim 1, wherein accessing the network destination comprises retrieving a web page corresponding to the selected bookmark media object.

4. The method of claim 1, wherein accessing the network destination comprises retrieving a three-dimensional environment corresponding to the selected bookmark media object.

5. The method of claim 1, wherein presenting the bookmark media object comprises retrieving the bookmark media objects from one or more hosts.

6. The method of claim 1 wherein presenting the bookmark media object comprises displaying at least one thumbnail.

7. The method of claim 1, wherein presenting the bookmark media object comprises displaying a matrix of bookmark media objects.

8. The method of claim 1 wherein presenting the bookmark media object comprises displaying a stream of video.

9. The method of claim 1 wherein displaying the bookmark media object comprises outputting audible sounds.

10. The method of claim 1 and further including:
    determining a status of the bookmark media object; and
    presenting a default bookmark media object when the status indicates the corresponding bookmark media object is not available.

11. The method of claim 1, wherein the bookmark media object represents a current state of the corresponding network destination.

12. The method of claim 1, wherein the bookmark media object represents an entry point into three-dimensional content defined by the web pages.

13. The method of claim 1, wherein the bookmark media object when presented to a user provides a multimedia preview of the corresponding destination.

14. A method comprising:
    generating a set of bookmark media objects, each bookmark media object corresponding to a network destination within a computing environment, each bookmark media object providing a representation of the corresponding network destination;
    storing the bookmark media objects on one or more servers within the computing environment;
    updating each bookmark media object as a function of a state of the corresponding network destination; and
    in response to a request received from the client device, providing one or more bookmark media objects to a remote client device, the client device having a location external to the computing environment.

15. The method of claim 14, wherein updating each bookmark media object comprises updating each bookmark media object as a function of a current state of the corresponding network destination.

16. The method of claim 14, wherein updating each bookmark media object comprises updating each bookmark media object as a function of the information received from a remote user.

17. The method of claim 14, wherein the set of bookmark media objects is generated by a server within the computing environment, and further wherein updating each bookmark media object comprises updating each bookmark media object as a function of host-determined conditions.

18. The method of claim 14, wherein updating each bookmark media object comprises updating each bookmark media object when content of the corresponding network destination is changed.

19. The method of claim 14, wherein generating the set of bookmark media objects includes generating a thumbnail for a first bookmark media object in the set.

20. The method of claim 14, wherein generating the set of bookmark media objects includes generating a video stream for a first bookmark media object in the set.

21. The method of claim 14, wherein generating the set of bookmark media objects includes generating an audio stream for a first bookmark media object in the set.

22. The method of claim 14 further comprising communicating the bookmark media objects to a client device for display to a user.

23. A non-transitory computer-readable medium having instructions stored thereon to cause a programmable processor to:
    receive a first user input on a client device bookmarking a remote destination displayed on the client device;
    in response to the first user input, store a link to the destination and a link to a remote bookmark media object associated with the destination on the client device;
    receive a second user input on the client device requesting a display of a bookmark window;
    in response to the second user input, display a bookmark window, retrieving the remote associated bookmark media object, including in the displayed bookmark window a bookmark for the destination and the retrieved remote associated bookmark media object, the retrieved remote associated bookmark media object providing a representation of the destination;
    receive a third user input on the client device selecting the remote associated bookmark media object displayed in the bookmark window; and
    in response to the third user input, access the destination.

24. The non-transitory computer-readable medium of claim 23, wherein the instructions cause the programmable processor to store on the client device a set of references to a plurality of bookmark media objects in response to a user input bookmarking each corresponding remote destination.

25. The non-transitory computer-readable medium of claim 23, wherein the instructions cause the programmable processor to retrieve a web page corresponding to the selected bookmark media object.

26. The non-transitory computer-readable medium of claim 23, wherein the instructions cause the programmable processor to retrieve a three-dimensional environment corresponding to the selected bookmark media object.

27. The non-transitory computer-readable medium of claim 23, wherein the instructions cause the programmable processor to present the bookmark media object by displaying at least one thumbnail.

28. The non-transitory computer-readable medium of claim 23, wherein the instructions cause the programmable processor to present the bookmark media object by displaying a stream of video.

29. The non-transitory computer-readable medium of claim 23, wherein the instructions cause the programmable processor to output audible sounds in response to at least one audio signal.

30. The non-transitory computer-readable medium of claim 23, wherein the instructions cause the programmable processor to determine a status of the bookmark media object;

and present a default bookmark media object when the status indicates the corresponding bookmark media object is not available.

31. The non-transitory computer-readable medium of claim 23, wherein each bookmark media object represents a current state of the corresponding network destination.

32. A system comprising:
a remote server, the remote server configured to store a bookmark media object, wherein the bookmark media object is associated with a destination located on the server;
a client device communicatively coupled to the server and configured to, in response to a first user input, store a link to the destination and a link to a remote bookmark media object associated with the destination on the client device; and
a web browser executing in an operating environment provided by the client device, wherein the web browser is configured to:
receive a second user input on the client device requesting display of a bookmark window;
in response to the second user input, display a bookmark window, retrieving the remote associated bookmark media object, including in the displayed bookmark window a bookmark for the destination and the retrieved remote associated bookmark media object, the retrieved remote associated bookmark media object providing a representation of the destination;
receive a third user input on the client device selecting the remote associated bookmark media object displayed in the bookmark window; and
in response to the third user input, access the destination.

33. The system of claim 32, wherein the bookmark media object comprises a thumbnail.

34. The system of claim 32, wherein the bookmark media object comprises an audio stream.

35. The system of claim 32, wherein the bookmark media object comprises a video stream.

36. The system of claim 32, wherein a client device configured to store references to the bookmark media object on the web server.

37. The system of claim 32, wherein the web server is configured to update the bookmark media object as a function of a current state of the corresponding network destination.

38. The system of claim 37, wherein the web server is configured to update the bookmark media object as a function of information received from the web browser.

39. The system of claim 37, wherein the web server is configured to update the bookmark media object when content of the network destination is changed.

40. A computer program product, tangibly stored on a non-transitory computer readable medium, comprising instructions operable to cause a programmable processor to:
generate a set of bookmark media objects, each bookmark media object corresponding to a network destination within a computing environment, each bookmark media object providing a representation of the corresponding network destination;
store the bookmark media objects on one or more servers within the computing environment;
update each bookmark media object as a function of a state of the corresponding network destination; and
in response to a request received from the client device, provide one or more bookmark media objects to a remote client device, the client device having a location external to the computing environment.

41. The product of claim 40, wherein instructions to update each bookmark media object comprise instructions to update each bookmark media object as a function of a current state of the corresponding network destination.

42. The product of claim 40, wherein the set of bookmark media objects is generated by a server within the computing environment, and further wherein instructions to update each bookmark media object comprise instructions to update each bookmark media object as a function of host-determined conditions.

43. The product of claim 40, wherein instructions to update each bookmark media object comprise instructions to update each bookmark media object when content of the corresponding network destination is changed.

44. The product of claim 40, wherein instructions to generate a set of bookmark media objects comprise instructions to generate a thumbnail for a first bookmark media object in the set.

45. The product of claim 40, wherein instructions to generate a set of bookmark media objects comprise instructions to generate a video stream for a first bookmark media object in the set.

46. The product of claim 40, wherein instructions to generate a set of bookmark media objects comprise instructions to generate an audio stream for a first bookmark media object in the set.

* * * * *

UNITED STATES PATENT AND TRADEMARK OFFICE
CERTIFICATE OF CORRECTION

| | | |
|---|---|---|
| PATENT NO. | : 8,166,384 B1 | Page 1 of 1 |
| APPLICATION NO. | : 09/594054 | |
| DATED | : April 24, 2012 | |
| INVENTOR(S) | : Michael Kaplan | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 4052 days.

Signed and Sealed this
Thirtieth Day of July, 2013

Teresa Stanek Rea
*Acting Director of the United States Patent and Trademark Office*